US010827046B1

(12) United States Patent
Li et al.

(10) Patent No.: US 10,827,046 B1
(45) Date of Patent: Nov. 3, 2020

(54) ASSEMBLY FOR FOLDING AND UNFOLDING SCREEN, AND TERMINAL

(71) Applicant: Beijing Xiaomi Mobile Software Co., Ltd., Beijing (CN)

(72) Inventors: Peng Li, Beijing (CN); Xuwang Cui, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 0 days.

(21) Appl. No.: 16/699,313

(22) Filed: Nov. 29, 2019

(30) Foreign Application Priority Data

Apr. 25, 2019 (CN) .......................... 2019 1 0340379

(51) Int. Cl.
  *H04M 1/02* (2006.01)
  *H01Q 1/22* (2006.01)
  *G06F 1/16* (2006.01)
  *H01Q 1/24* (2006.01)

(52) U.S. Cl.
  CPC .......... *H04M 1/0214* (2013.01); *H01Q 1/243* (2013.01); *H04M 1/0268* (2013.01)

(58) Field of Classification Search
  CPC .... H04M 1/02; H04M 1/0241; H04M 1/0206; H04B 1/38; H04B 1/3833; H01Q 1/22; H01Q 1/24; H01Q 1/243; G06F 1/16; G06F 1/1618; G06F 1/1613
  See application file for complete search history.

(56) References Cited

U.S. PATENT DOCUMENTS

| | | | | |
|---|---|---|---|---|
| 7,050,835 B2* | 5/2006 | Hack | ................... | H04M 1/0235 455/566 |
| 7,426,107 B2* | 9/2008 | Yeh | ........................ | G06F 1/1626 340/815.4 |
| 7,667,962 B2* | 2/2010 | Mullen | ................. | G06F 1/1669 361/679.56 |
| 7,953,462 B2* | 5/2011 | Harry | ..................... | G06Q 30/02 455/575.1 |
| 8,711,566 B2* | 4/2014 | O'Brien | ................ | G06F 1/1624 361/724 |
| 8,855,727 B2* | 10/2014 | Vartanian | ............... | G06Q 30/02 455/575.1 |

(Continued)

FOREIGN PATENT DOCUMENTS

| | | |
|---|---|---|
| CN | 201194147 Y | 2/2009 |
| CN | 107526395 A | 12/2017 |

(Continued)

OTHER PUBLICATIONS

International Search Report of counterpart PCT Application No. PCT/CN2019/098663, dated Feb. 13, 2020.

(Continued)

*Primary Examiner* — Blane J Jackson
(74) *Attorney, Agent, or Firm* — Finnegan, Henderson, Farabow, Garrett & Dunner, L.L.P.

(57) ABSTRACT

An assembly for folding and unfolding a screen and disposed in a terminal, includes: a folding and unfolding device, a first display screen, and a first antenna group. The first display screen is a flexible screen; the folding and unfolding device is configured to fold or unfold the first display screen by a change in structural form; and the first antenna group is disposed in the folding and unfolding device.

11 Claims, 12 Drawing Sheets

(56) References Cited

U.S. PATENT DOCUMENTS

| | | |
|---|---|---|
| 2002/0090980 A1* | 7/2002 | Wilcox ................. G06F 1/1684 |
| | | 455/566 |
| 2006/0118625 A1 | 6/2006 | Sekita |
| 2006/0194619 A1* | 8/2006 | Wilcox ................. G06F 1/1632 |
| | | 455/566 |
| 2008/0151480 A1* | 6/2008 | Chung ................. G06F 1/1652 |
| | | 361/679.06 |
| 2010/0029335 A1 | 2/2010 | Vartanian |
| 2010/0283713 A1 | 11/2010 | Fein et al. |
| 2014/0194165 A1 | 7/2014 | Hwang |
| 2016/0231785 A1* | 8/2016 | Vartanian .............. G06F 3/0412 |
| 2017/0110786 A1* | 4/2017 | Liu ..................... H01Q 1/2266 |
| 2018/0316379 A1* | 11/2018 | Chang .................... H04B 1/401 |
| 2019/0103656 A1 | 4/2019 | Shi et al. |

FOREIGN PATENT DOCUMENTS

| | | | | |
|---|---|---|---|---|
| CN | 107980157 A | | 5/2018 | |
| CN | 108594934 A | * | 9/2018 | .............. G06F 1/16 |
| CN | 108594934 A | | 9/2018 | |
| CN | 109244674 A | | 1/2019 | |
| CN | 209487700 U | * | 10/2019 | .............. H01Q 1/22 |
| JP | 2007171831 A | | 7/2007 | |
| JP | 2010078684 A | | 4/2010 | |
| RU | 114211 U1 | | 3/2012 | |

OTHER PUBLICATIONS

First Office Action of Russian Application No. 2019141626/07 dated Jul. 29, 2020.
Extended European Search Report in European Application No. 19218226.9, dated Jul. 8, 2020.

* cited by examiner

US 10,827,046 B1

ASSEMBLY FOR FOLDING AND UNFOLDING SCREEN, AND TERMINAL

CROSS-REFERENCE TO RELATED APPLICATIONS

The present application is based upon and claims priority to Chinese Patent Application No. 201910340379.3, filed on Apr. 25, 2019, the entire content of which is incorporated herein by reference.

TECHNICAL FIELD

The present disclosure generally relates to terminal technologies, and more particularly, to an assembly for folding and unfolding a screen, and a terminal including the assembly.

BACKGROUND

With the development of science and technologies, people use terminals in daily life more frequently. When a terminal transmits data, the rate of data transmission is closely related to the ability of the terminal antenna to receive signals.

In the related art, developers of terminals generally consider the shape and size of the antenna used in the terminals according to the shape characteristics of the terminals, the layout of the internal components, and the position that users may hold when using the terminals, and find a suitable fixed position in the terminals to dispose the antenna, so that the antenna can provide good antenna performance.

SUMMARY

According to a first aspect of embodiments of the present disclosure, there is provided an assembly for folding and unfolding a screen, wherein the assembly is disposed in a terminal and includes a folding and unfolding device, a first display screen, and a first antenna group; wherein: the first display screen is a flexible screen; the folding and unfolding device is configured to fold or unfold the first display screen by a change in structural form; and the first antenna group is disposed in the folding and unfolding device.

According to a second aspect of embodiments of the present disclosure, there is provided a terminal, comprising the assembly according to the first aspect.

Technical solutions according to embodiments of the present disclosure have at least the following advantageous effects.

The assembly disposed in a terminal includes a folding and unfolding device, a first display screen, and a first antenna group. The first display screen is a flexible screen. The folding and unfolding device is configured to fold or unfold the first display screen by a change in structural form. The first antenna group is disposed in the folding and unfolding device. By the folding and unfolding device, if the terminal makes the first display screen unfolded from the folding and unfolding device, the terminal may use the first antenna group in the folding and unfolding device to transmit data. In this way, embodiments of the present disclosure can avoid that, if the appearance of the terminal is changed, the wireless environment for the terminal to transmit and receive data becomes poor and the performance of the terminal in data transmission and reception becomes poor. Accordingly, embodiments of the present disclosure can improve the performance of the terminal in data transmission and reception.

The above general description and the following detailed description are merely exemplary and explanatory and are not limiting of the disclosure.

BRIEF DESCRIPTION OF THE DRAWINGS

The accompanying drawings, which are incorporated in and constitute a part of this specification, illustrate embodiments consistent with the present disclosure and, together with the description, serve to explain the principles of the present disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of devices and methods consistent with aspects related to the present disclosure as recited in the appended claims.

Embodiments of the present disclosure can be used in the scenario of internal data transmission of a terminal.

In the embodiments, a Laser Direct Structuring (LDS) antenna may be a metal antenna generated on a device of a terminal in accordance with the trajectory of conductive patterns using LDS technology.

In the embodiments, a Flexible Printed Circuit (FPC) may be a flexible printed circuit board made of polyimide or polyester thin film.

In the embodiments, a flexible screen may be a flexible Organic Light-Emitting Diode (OLED) screen.

Figure 1:
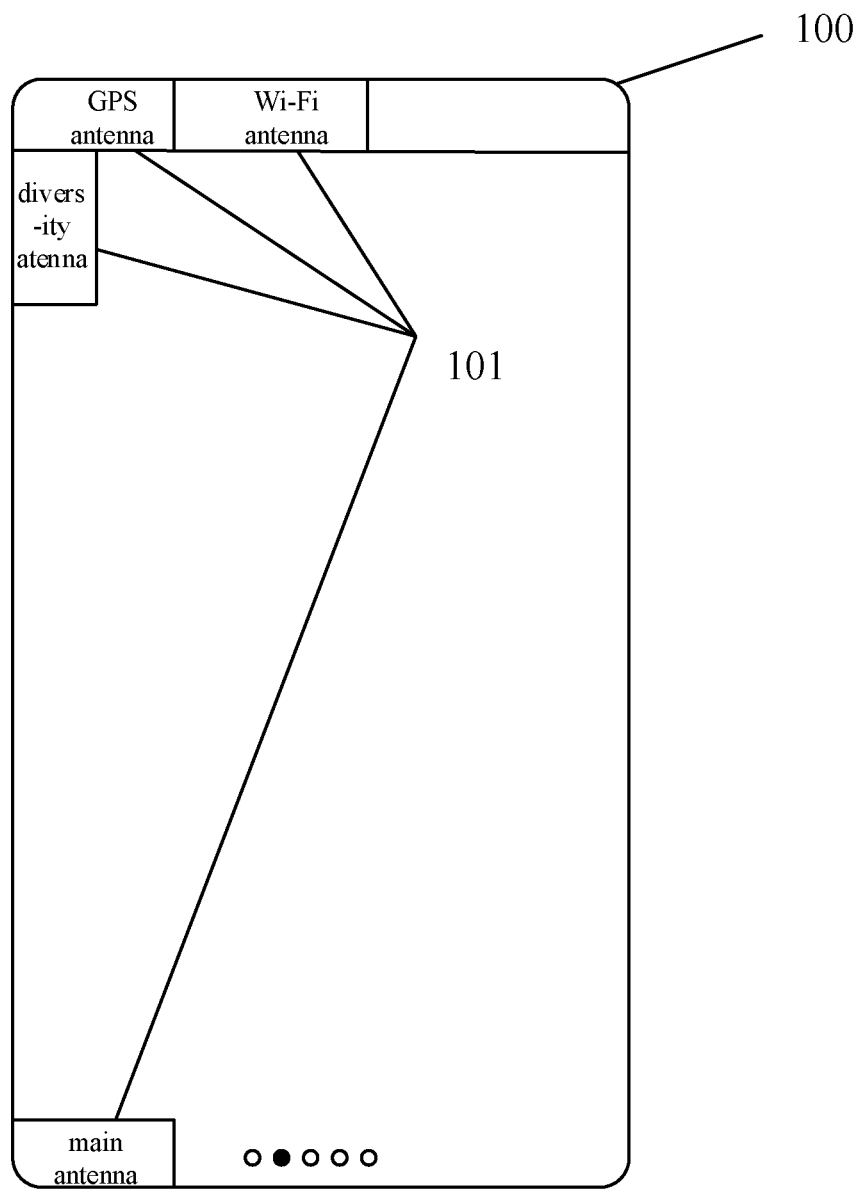
FIG. 1 is a schematic diagram of a terminal according to an exemplary embodiment of the present disclosure.

FIG. 1 is a schematic diagram of a terminal according to an exemplary embodiment of the present disclosure. As shown in FIG. 1, the terminal 100 includes a first antenna group 101. The first antenna group 101 may include a main antenna, a diversity antenna, a Global Positioning System (GPS) receiving antenna, and a Wireless Fidelity (WiFi) receiving antenna of the terminal. The antenna included in the first antenna group 101 may be an antenna formed by the LDS technology or FPC technology.

In some embodiments, when the terminal needs to perform data transmission, data may be transmitted through the first antenna group 101. For example, when a user needs to use GPS positioning in the terminal, the terminal may use the GPS receiving antenna in the first antenna group 101 to transmit geographic location data; when the user uses the terminal to conduct a voice call, the terminal may use the main antenna or the diversity antenna to transmit voice data, and so on.

In some embodiments, the terminal may be a smart phone, a tablet computer, an e-book reader, a smart glasses, a smart watch, a Moving Picture Experts Group Audio Layer III (MP3) player, a Moving Picture Experts Group Audio Layer IV (MP4) player, a notebook computer, a laptop or a desktop computer, and so on.

In the related art, the shape of the terminal is generally fixed, and the appearance of the terminal has a great influence on the wireless environment around the terminal. Therefore, the shape of the terminal needs to be considered in the antenna design. Typically, the antenna is placed in the housing of the terminal. In order to increase the screen size when the terminal displays data or information and to ensure portability, the present disclosure proposes a new terminal scheme with a flexible screen. In the embodiments of the present disclosure, the terminal has a folding and unfolding device for folding and unfolding a screen, and the folding and unfolding device can fold or unfold a flexible display screen by a change in structural form of the folding and unfolding device.

In some embodiments, when the structural form of the folding and unfolding device is changed, the appearance of the terminal may be changed, which may cause a change in the wireless environment around the terminal, and may consequently degrade the performance of the terminal antenna in data transmission and reception, for example, may affect the signal strength and stability when the antenna sends and receives data.

Figure 2:
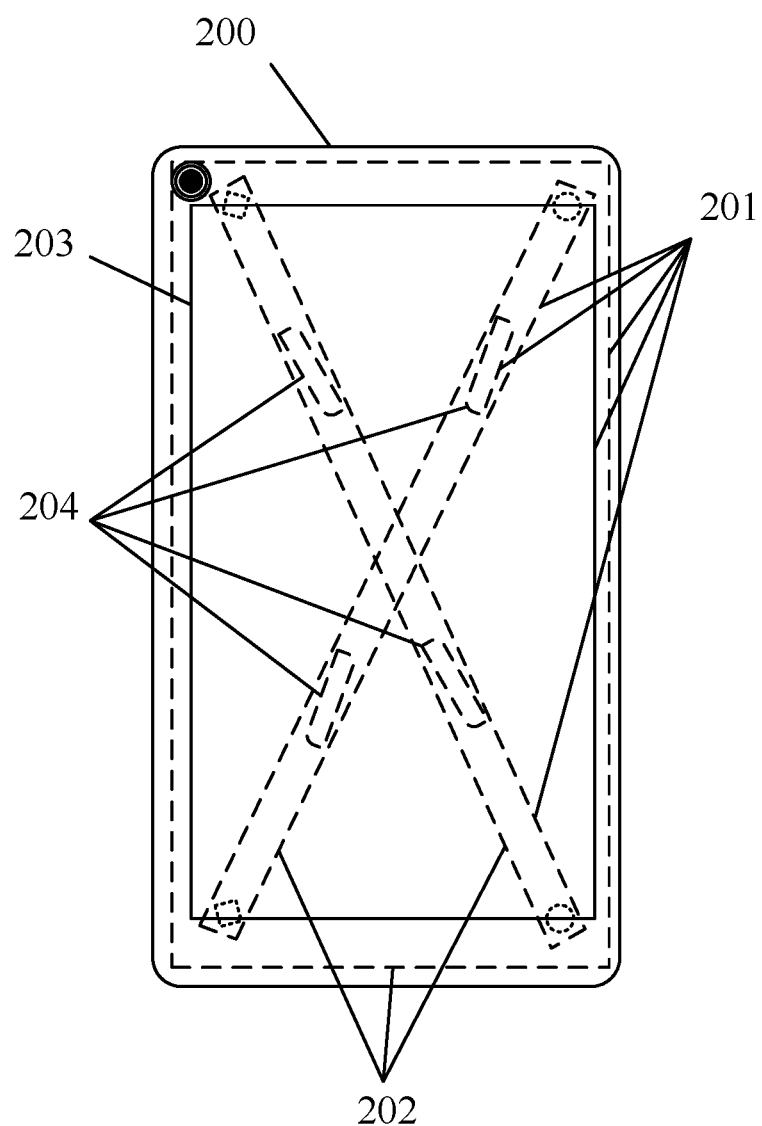
FIG. 2 is a schematic diagram of a folding and unfolding assembly according to an embodiment of the present disclosure.

Embodiments of the present disclosure provide a folding and unfolding assembly for folding and unfolding a screen. The folding and unfolding assembly can be disposed in a terminal. FIG. 2 is a schematic diagram of a folding and unfolding assembly according to an embodiment of the present disclosure. As shown in FIG. 2, a folding and unfolding assembly 201 is included in a terminal 200. The folding and unfolding assembly 201 includes a folding and unfolding device 202, a first display screen 203, and a first antenna group 204.

The first display screen 203 is a flexible screen.

The folding and unfolding device 202 is configured to fold or unfold the first display screen 203 by a change in structural form.

The first antenna group 204 is disposed in the folding and unfolding device 202.

The first antenna group 204 may be an antenna provided according to a shape and structure of the terminal 200 in a screen-unfolding configuration. The screen-unfolding configuration refers to the shape and structure of the terminal 200 after the folding and unfolding device 202 unfolds the first display screen 203 by a change in structural form. The first antenna group 204 can have better antenna performance in the case where the folding and unfolding device 202 unfolds the first display screen 203 by a change in structural form.

In some embodiments, the folding and unfolding device 202 includes a support assembly which has a contracted state and a supporting state, and the first antenna group 204 is disposed in the support assembly.

In some embodiments, the support assembly includes at least one set of support bars, first ends of the at least one set of support bars are coupled to the first display screen 203, a moving direction of the first ends of the at least one set of support bars connected to the first display screen 203 is the same as a direction in which the first display screen 203 is folded or unfolded; and the first antenna group 204 is disposed inside the at least one set of support bars or on surfaces of the at least one set of support bars.

In some embodiments, the first antenna group 204 includes at least one of a main antenna, a diversity antenna, a satellite positioning antenna, a wireless fidelity Wi-Fi antenna, and a Bluetooth antenna.

In the embodiments of the present disclosure, the first antenna group is disposed in the folding and unfolding device. By the folding and unfolding device, if the terminal makes the first display screen unfolded from the folding and unfolding device, the terminal may use the first antenna group in the folding and unfolding device to transmit data. In this way, embodiments of the present disclosure can avoid that, if the appearance of the terminal is changed, the wireless environment for the terminal to transmit and receive data becomes poor and the performance of the terminal in data transmission and reception becomes poor. Accordingly, embodiments of the present disclosure can improve the performance of the terminal in data transmission and reception.

Figure 3:
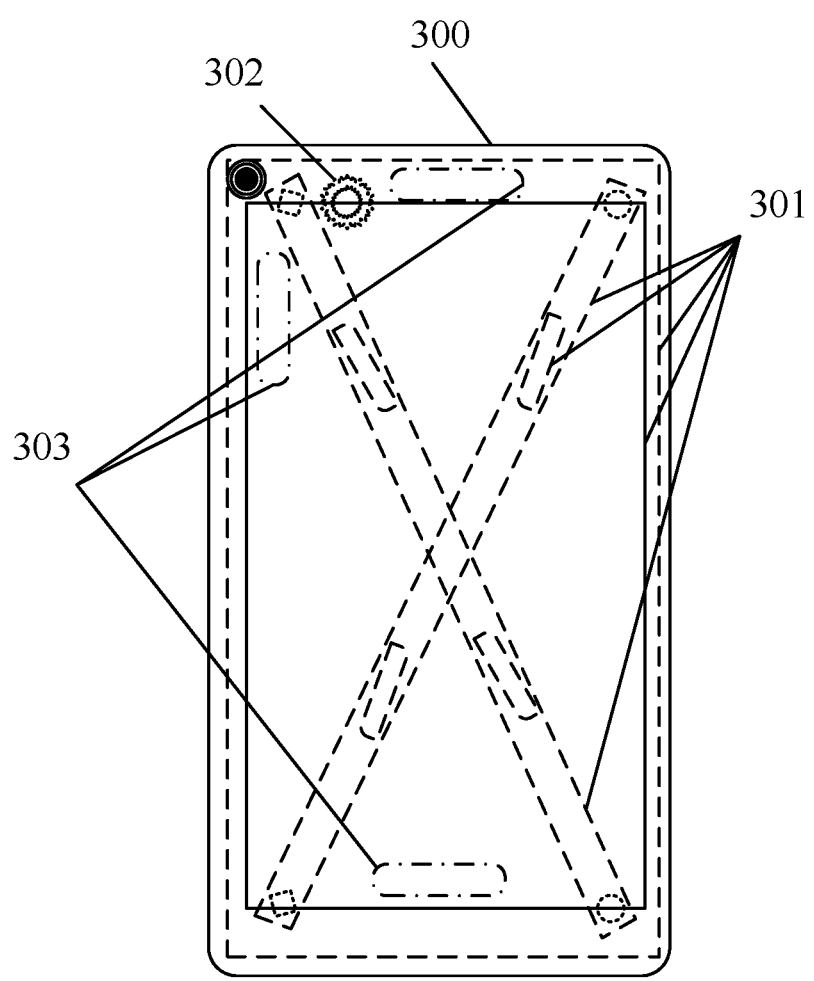
FIG. 3 is a schematic diagram of a terminal according to an embodiment of the present disclosure.

In an embodiment, the terminal in which the folding and unfolding assembly is applied may further include a radio frequency chip and a second antenna group. FIG. 3 is a schematic diagram of a terminal according to an embodiment of the present disclosure. As shown in FIG. 3, a terminal 300 include a screen folding and unfolding assembly 301, a radio frequency chip 302, and a second antenna group 303.

The radio frequency chip 302 is electrically connected to the first antenna group in the folding and unfolding device of the folding and unfolding assembly 301, and the radio frequency chip 302 is electrically connected to the second antenna group.

The radio frequency chip 302 is configured to switch from performing transmission and reception of wireless data through the second antenna group to performing transmission and reception of the wireless data through the first antenna group when the folding and unfolding device unfolds the first display screen by the change in structural form.

In some embodiments, the radio frequency chip 302 is configured to, if a first specified condition is met, determine that the folding and unfolding device unfolds the first display screen by the change in structural form.

The first specified condition includes at least one of the following conditions that:

a first signal sent by a processor in the terminal is received, wherein the first signal is a signal generated when the processor determines that the first display screen is unfolded;

a second signal generated when a designated button is triggered is received, wherein the designated button is a button for controlling folding or unfolding of the first display screen; and a third signal generated when a first designated switch is turned on is received, wherein the first designated switch is a switch that is triggered to be turned on when the first display screen is unfolded.

In some embodiments, the radio frequency chip 302 is configured to switch from performing transmission and reception of wireless data through the second antenna group 303 to performing transmission and reception of the wireless data through the first antenna group, when the folding and unfolding device unfolds the first display screen by the change in structural form and a signal quality of a wireless signal received through the second antenna group 303 is lower than a first quality threshold.

In some embodiments, the radio frequency chip 302 is configured to switch from performing transmission and reception of the wireless data through the first antenna group to performing transmission and reception of the wireless data through the second antenna group, when the folding and unfolding device folds the first display screen by the change in structural form.

In some embodiments, the radio frequency chip 302 is configured to, if a second specified condition is met, determine that the folding and unfolding device folds the first display screen by the change in structural form.

The second specified condition includes at least one of the following conditions that:

a fourth signal sent by a processor in the terminal is received, wherein the fourth signal is a signal generated when the processor determines that the first display screen is folded;

a fifth signal generated when a designated button is triggered is received, wherein the designated button is a button for controlling folding or unfolding of the first display screen; and a sixth signal generated when a second designated switch is turned on is received, wherein the second designated switch is a switch that is triggered to be turned off when the first display screen is folded.

In some embodiments, the radio frequency chip 302 is configured to switch from performing transmission and reception of wireless data through the first antenna group to performing transmission and reception of the wireless data through the second antenna group 303, when the folding and unfolding device folds the first display screen by the change in structural form and a signal quality of a wireless signal received through the first antenna group is lower than a second quality threshold.

In some embodiments, the first antenna group and the second antenna group include the same type of antenna.

In the embodiments of the present disclosure, the first antenna group is disposed in the folding and unfolding device. By the folding and unfolding device, if the terminal makes the first display screen unfolded from the folding and unfolding device, the terminal may use the first antenna group in the folding and unfolding device to transmit data. In this way, embodiments of the present disclosure can avoid that, if the appearance of the terminal is changed, the wireless environment for the terminal to transmit and receive data becomes poor and the performance of the terminal in data transmission and reception becomes poor. Accordingly, embodiments of the present disclosure can improve the performance of the terminal in data transmission and reception.

Figure 4:
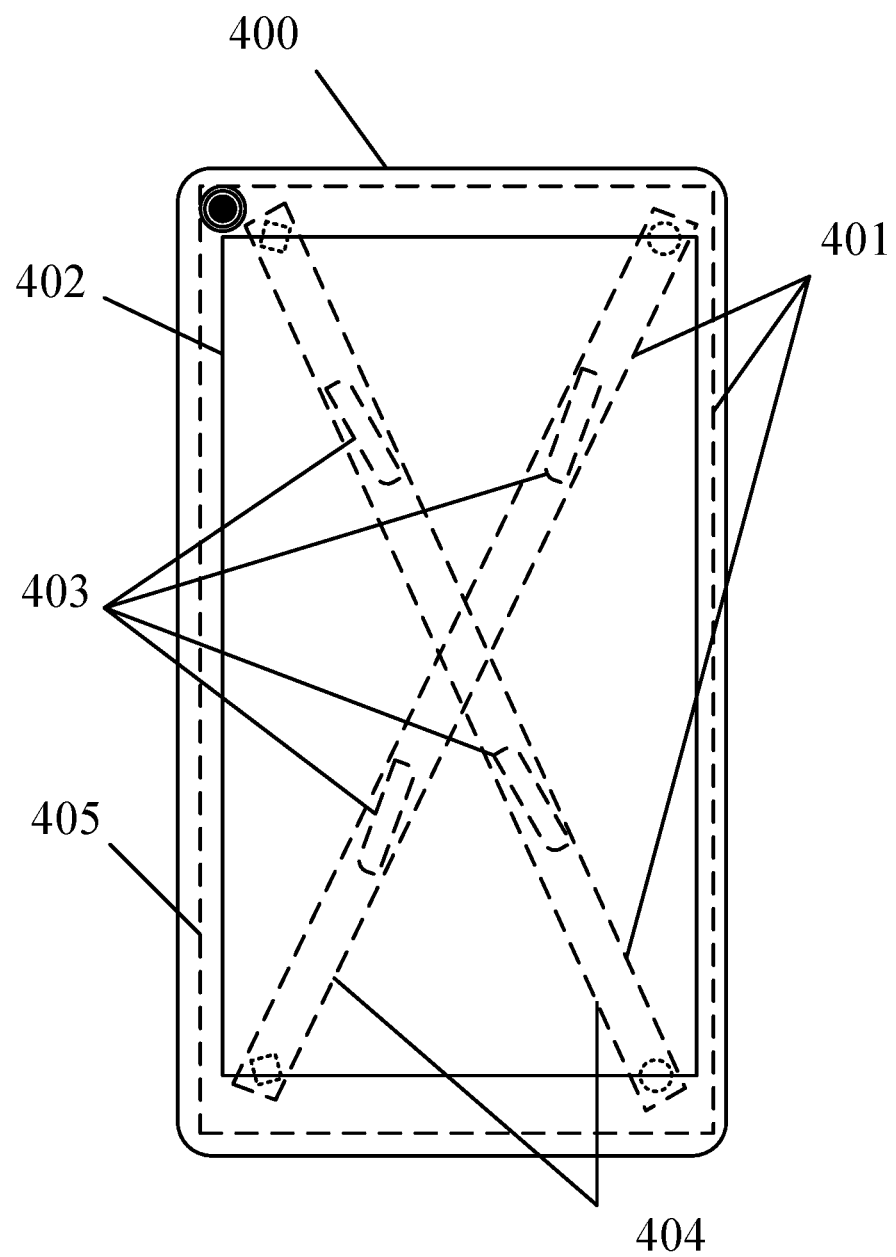
FIG. 4 is a schematic diagram of a terminal according to an embodiment of the present disclosure.

FIG. 4 is a schematic diagram of a terminal according to an embodiment of the present disclosure. As shown in FIG. 4, a terminal 400 includes a folding and unfolding device 401, a first display screen 402, and a first antenna group 403. The first display screen 402 is a flexible screen. The folding and unfolding device 401 is configured to fold or unfold the first display screen 402 by a change in structural form. The first antenna group 403 is disposed in the folding and unfolding device.

As shown in FIG. 4, the first display screen 402 is disposed on the back of the terminal, the folding and unfolding device 401 is disposed inside the terminal, and the first display screen 402 may be connected to the folding and unfolding device 401. When the structural form of the folding and unfolding device 401 is changed, the first display screen 402 is unfolded from the folding and unfolding device 401 or folded in the folding and unfolding device 401. When the first display screen 402 is unfolded from the folding and unfolding device 401, the terminal may display contents by using the first display screen 402. When the first display screen is received or folded in the folding and unfolding device 401, the terminal may turn off the first display screen. In some embodiments, when the first display screen 402 is folded in the folding and unfolding device 401, a part of the first display screen 402 may be folded in the folding and unfolding device 401, and another part is shown at the back of the terminal 400, as shown in FIG. 4. In some embodiments, whether the first display screen 402 is unfolded from the folding and unfolding device 401 or folded in the folding and unfolding device 401 may be controlled by a user. For example, the user can control the terminal 400 to control the first display screen 402 to be unfolded from the folding and unfolding device 401, or to control the first display screen 402 to change from the unfolding state to a folding state in which the first display screen 402 is folded in the folding and unfolding device 401.

In some embodiments, the folding and unfolding device 401 can include a support assembly 404. The support assembly 404 has a contracted state and a supporting state. In some embodiments, the folding and unfolding device 401 can further include a holding component 405 which can be used to hold or house the first display screen 402. Further, the above-mentioned change in structural form of the folding and unfolding device 401, which is used to control the folding or unfolding of the first display screen 402, may be a change between the contracted state and the supporting state of the support assembly 404 included in the folding and unfolding device 401. For example, during the state transition of the support assembly 404 from the contracted state to the supporting state, the first display screen 402 is unfolded from the holding component 405; during the state transition of the support assembly 404 from the supporting state to the contracted state 405, the first display screen 402 is folded in the holding component. That is, the folding and unfolding device 401 folds or unfolds the first display screen 402 by changing the structural form. For example, the folding and unfolding device 401 may fold or unfold the first display screen 402 by a change in a form of the support assembly 404. In some embodiments, the holding component 405 can be a storage cavity having a space, and the first display screen 402 of the terminal can be held or housed in the storage cavity. That is, the first display screen 402, the holding component 405, and the support assembly 404 are connected and used in conjunction with each other to cause the first display screen 402 to be unfolded from the holding component 405 or folded into the holding component 405.

Figure 5:
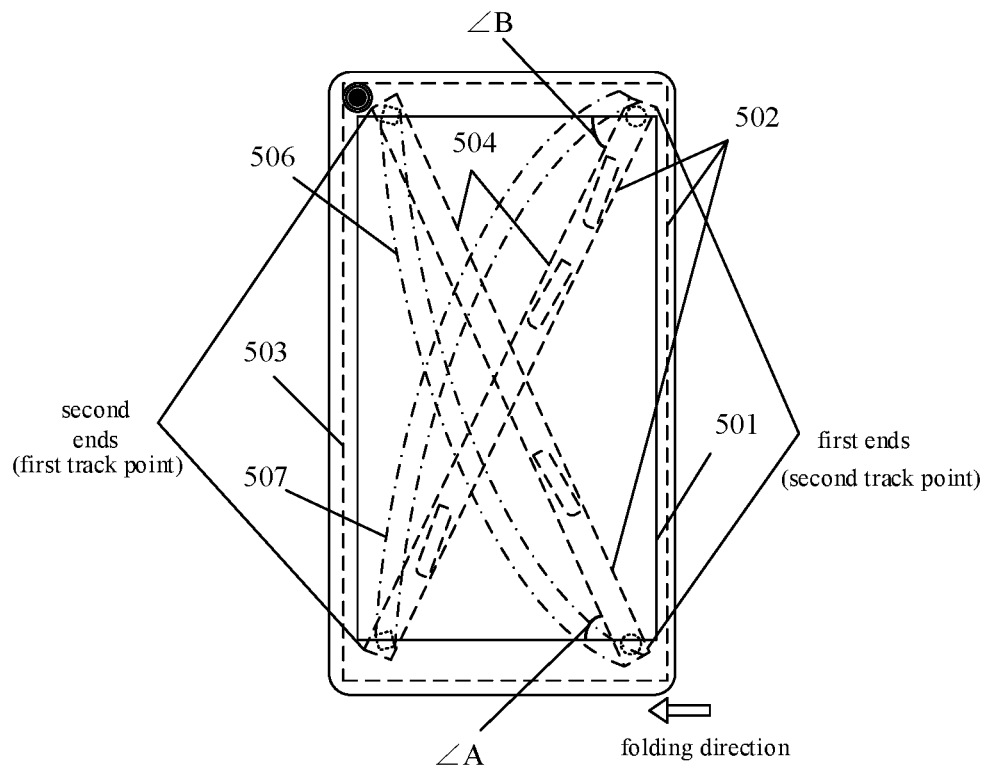
FIG. 5 is a schematic diagram showing a folding and unfolding device in a contracted state according to embodiments of the present disclosure.
Figure 6:
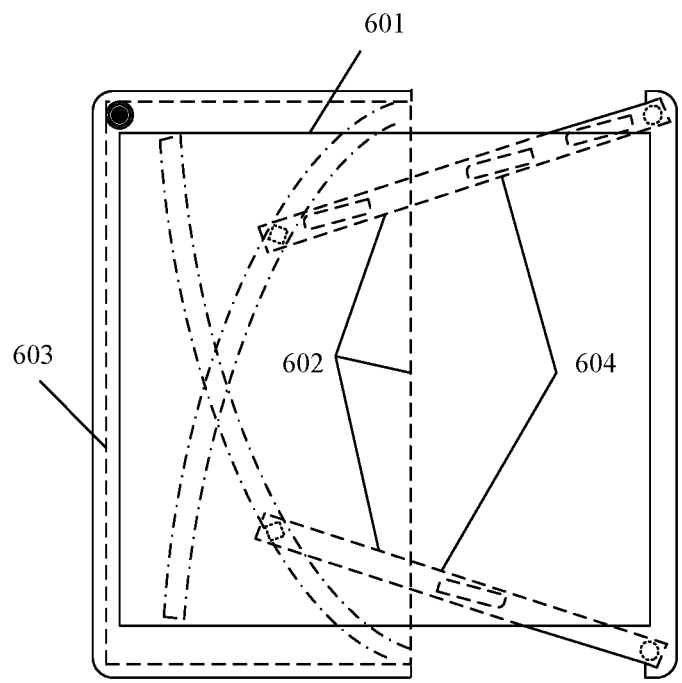
FIG. 6 is a schematic diagram showing a folding and unfolding device during a folding or unfolding procedure according to embodiments of the present disclosure.
Figure 7:
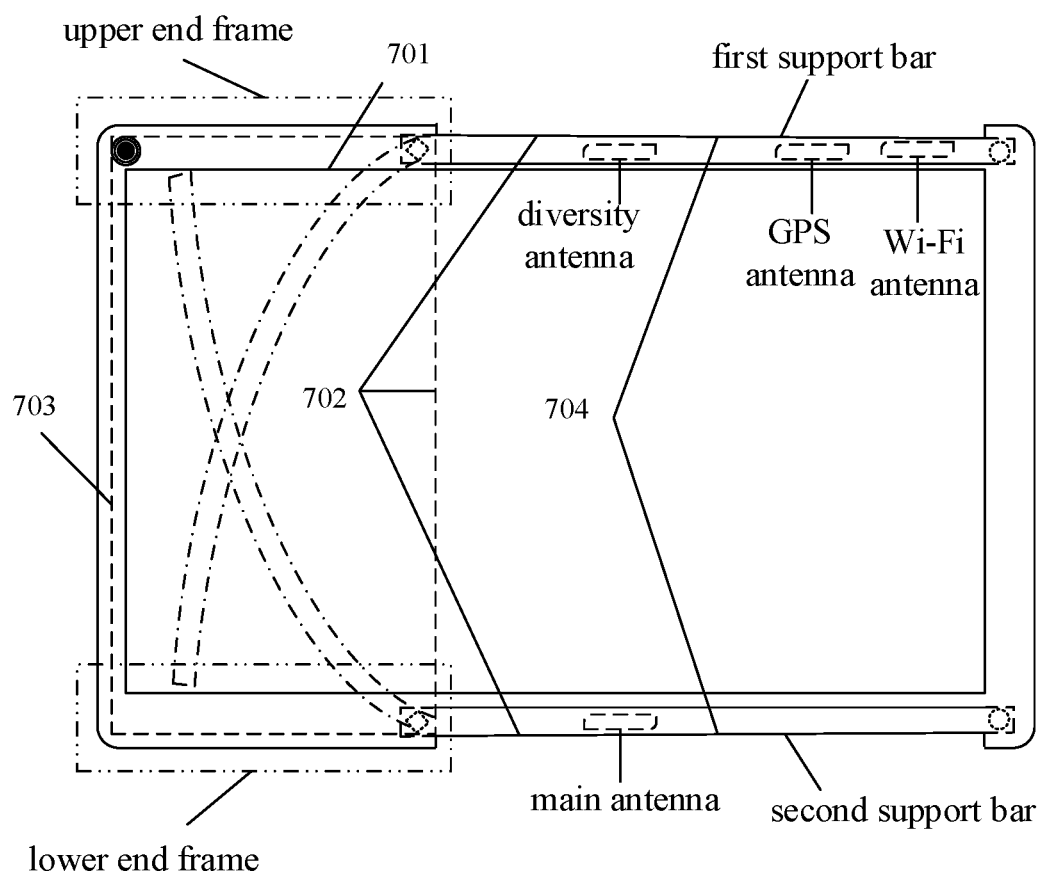
FIG. 7 is a schematic diagram showing a folding and unfolding device in a supporting state according to embodiments of the present disclosure.

FIG. 5 is a schematic diagram showing a folding and unfolding device in a contracted state according to embodiments of the present disclosure. As shown in FIG. 5, a first display screen 501, a screen folding and unfolding device 502, a holding component 503 and a support assembly 504 are included. The holding component 503 can be used to receive or hold a first display screen. The support assembly 504 can be used to unfold the first display screen from the holding component or fold the first display screen into the holding component. FIG. 6 is a schematic diagram showing a folding and unfolding device during folding or unfolding procedure according to embodiments of the present disclosure. As shown in FIG. 6, a first display screen 601, a folding and unfolding device 602, a holding component 603, and a support assembly 604 are included. FIG. 7 is a schematic diagram showing a folding and unfolding device which is in a supporting state involved in embodiments of the present disclosure. As shown in FIG. 7, a first display screen 701, a folding and unfolding device 702, a holding component 703, and a support assembly 704 are included.

When the support assembly is changed from the state shown in FIG. 5 to the state shown in FIG. 7, that is, the support assembly is changed from the contracted state to the supporting state, the first display screen is unfolded from the holding component; when the support assembly is changed from the state shown in FIG. 7 to the state shown in FIG. 5, that is, the support assembly is changed from the supporting state to the contracted state, the first display screen is folded or held in the holding component.

Referring back to FIG. 4, the first antenna group 403 may be disposed in the support assembly 404. That is, the support assembly 404 can serve as a container for the first antenna group 403 to arrange the first antenna group 403 in the support assembly 404. In some embodiments, the first antenna group 403 may be formed according to an LDS technology or an FPC technology or the like. In some embodiments, the terminal 400 further includes a processor. The first antenna group in the folding and unfolding device can transmit the received signal to the processor, and the processor further processes the received signal, thereby performing corresponding operations. For example, when the first antenna group includes the main antenna in the terminal, the terminal may send or receive communication signals by using the first antenna group, and when the terminal needs to send communication data through the main antenna, the terminal may use the main antenna in the first antenna group to transmit the data. Correspondingly, when the terminal needs to receive communication data through the main antenna, the terminal can receive the data through the main antenna in the first antenna group.

In an embodiment, the first antenna group 403 may be an antenna group that is preset according to a form (i.e., shape and structure) of the terminal after the first display screen is unfolded. That is, when the developer of the terminal sets the first antenna group, the target is that the first antenna group can achieve relatively high antenna performance in the case where the first display screen is unfolded.

In an embodiment, the first antenna group 403 may further include at least one of a main antenna, a diversity antenna, a satellite positioning antenna, a wireless fidelity Wi-Fi antenna, and a Bluetooth antenna. That is, the first antenna group included in the folding and unfolding device may include a plurality of antennas, and the functions of the antennas may be different. For example, the first antenna group may include a main antenna, a diversity antenna, a satellite positioning antenna, a wireless fidelity Wi-Fi antenna, and a Bluetooth antenna.

Figure 8:
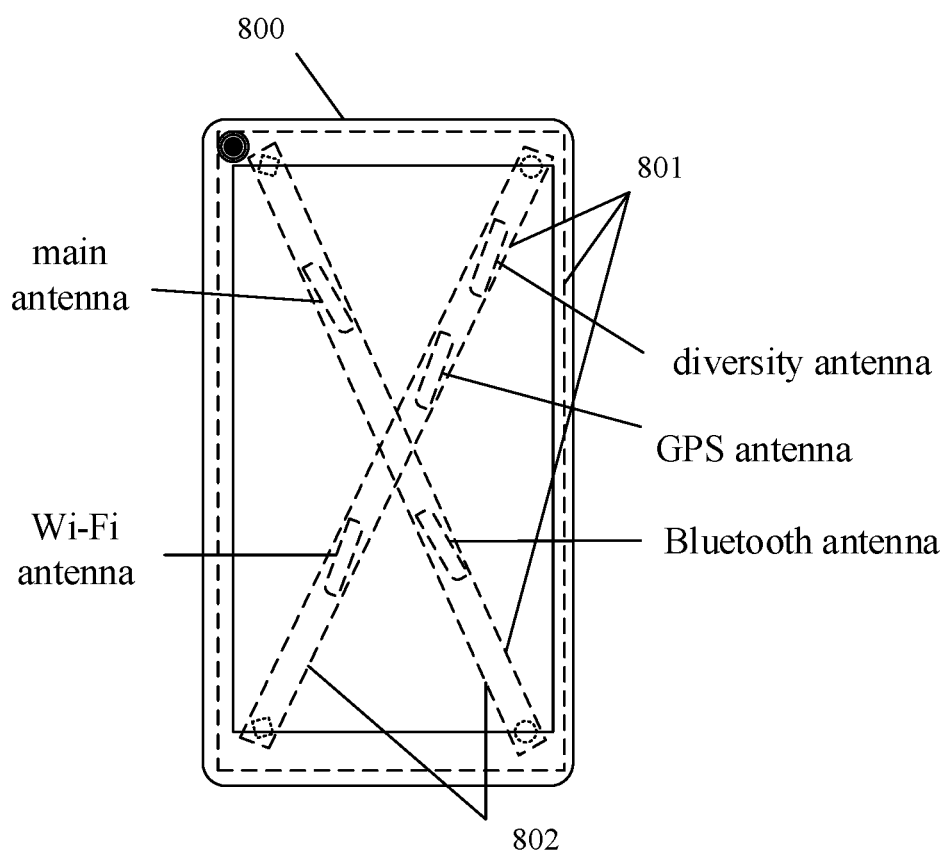
FIG. 8 is a schematic diagram showing a terminal in which a folding and unfolding device is disposed according to embodiments of the present disclosure.

FIG. 8 is a schematic diagram showing a terminal in which a folding and unfolding device is disposed according to embodiments of the present disclosure. In a terminal 800, the folding and unfolding device 801 includes a support assembly 802, the support assembly 802 contains a main antenna, a diversity antenna, a satellite positioning antenna, a wireless fidelity Wi-Fi antenna, and a Bluetooth antenna. When the terminal 800 needs to transmit the data type corresponding to one of the antennas, the corresponding antenna can be used to transmit the data. In some embodiments, the specific number of the antennas included in the first antenna group may be preset by the developer in the folding and unfolding device. For example, the first antenna group may include two main antennas and one diversity antenna. As another example, the first antenna group may include antennas each corresponding to one of the above mentioned types. Embodiments of the present disclosure do not impose specific limitations on the number of the antennas included in the first antenna group.

In some embodiments, the support assembly included in the folding and unfolding device as shown in FIG. 5 or FIG. 6 or FIG. 7 may include at least one set of support bars, first ends of the at least one set of support bars are coupled to the first display screen, a moving direction of the first ends of the at least one set of support bars connected to the first display screen is the same as a direction in which the first display screen is folded or unfolded. It should be noted that in the following description the at least one set of support bars provided by the embodiments of the present disclosure are exemplified by a set of support bars composed of two support bars (a first support bar and a second support bar). Further, the first ends of the at least one set of support bars may be directly connected or indirectly connected to the first display screen.

Figure 9:
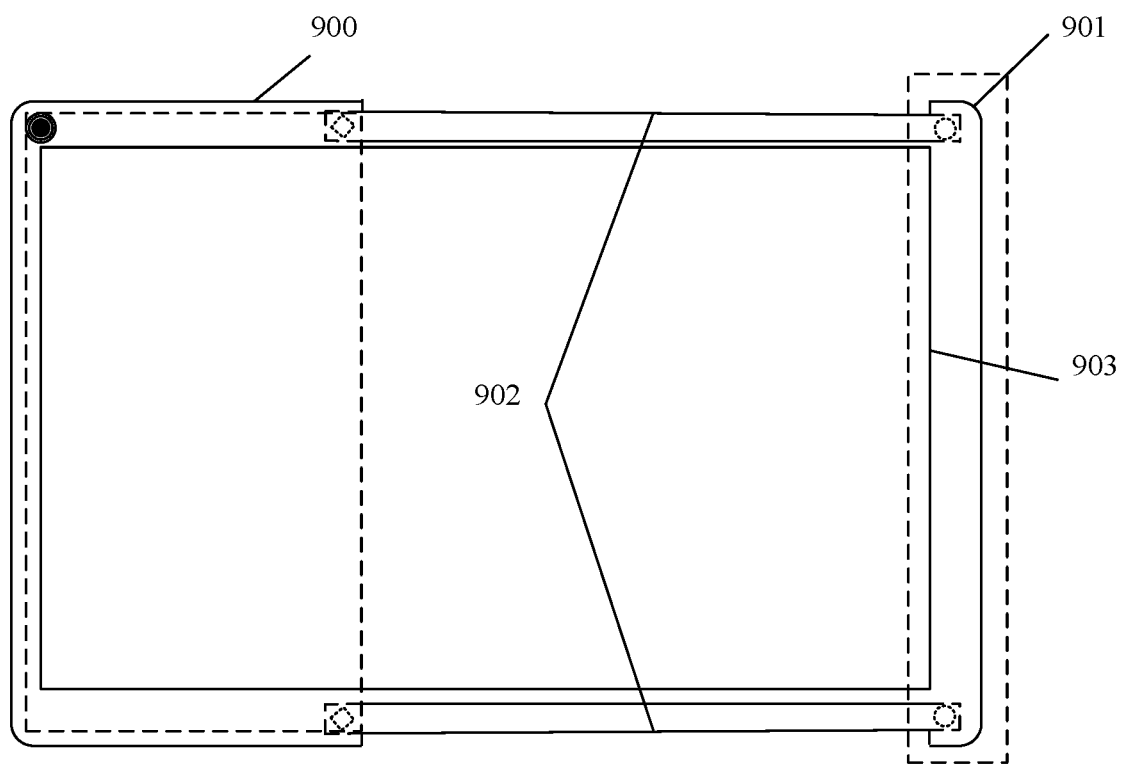
FIG. 9 is a schematic diagram showing a connection between a support assembly and a first display screen according to an embodiment of the present disclosure.

FIG. 9 is a schematic diagram showing a connection between a support assembly and a first display screen according to an embodiment of the present disclosure. As shown in FIG. 9, a terminal 900 includes a first frame 901, at least one set of support bars 902, and a first display screen 903. The at least one set of support bars 902 are connected to the first frame, and the first display screen is connected to the first frame. When the at least one set of support bars 902 change from the support state to the contracted state, the at least one set of support bars 902 can indirectly cause the first display screen to be folded into the holding component by driving the first frame 901. Alternatively, when at least one set of support bars 902 change from the contracted state to the support state, at least one set of support bars 902 can indirectly cause the first display screen to be unfolded from the holding component by driving the first frame 901. Embodiments of the present disclosure do not impose specific limitations on the connection manner between the first ends of the at least one set of support bars and the first display screen, as long as the moving direction of first ends of the at least one set of support bars are the same as the direction in which the first display screen is folded or unfolded.

In some embodiments, the first antenna group may be disposed inside the at least one set of support bars, or the first antenna group may also be disposed on the surfaces of the at least one set of support bars. In some embodiments, the terminal may decide whether to use the first antenna group included in the folding and unfolding assembly depending on whether the first display screen is unfolded or not. For example, when the first display screen is unfolded, the terminal uses the first antenna group to transmit and receive data. When the first display screen is folded, the terminal may stop using the first antenna group to transmit and receive data, and instead, use other antenna in the terminal to receive or transmit data, or interrupt receiving and transmission of data.

In some embodiments, when the support assembly is in the support state, at least one set of support bars support the first display screen at the periphery, so that when the first display screen is unfolded, the first antenna group is located at the periphery of the first display screen. For example, as shown in FIG. 7, when at least one set of support bars are in the supporting state, the first support bar is at the upper end of the first display screen and is in the same parallel position with the upper end frame of the terminal, and the second support bar is at the lower end of the first display screen and is in the same parallel position with the lower end frame of the terminal. In this way, the first antenna group can be located at the periphery of the first display screen, and when the first display screen is unfolded, the at least one set of support bars can function to protect the first display screen.

In some embodiments, when the support assembly is in the contracted state, the at least one set of support bars are at a specified angle with a direction in which the first display screen is folded or unfolded, and the at least one set of support bars are inside the terminal. For example, as shown in FIG. 5, when the support assembly is in the contracted state, an angle A is the angle between the first support bar and the direction in which the first display screen is unfolded or folded, and an angle B is the angle between the second support bar and the direction in which the first display screen is unfolded or folded. In some embodiments, the angle may be decided according to the material of the support bars, the connection manner of the support bars, the placement position of the support bars, and the like when the developer designs the terminal, and embodiments of the present disclosure do not impose specific limitations on the value of the angle. In some embodiments, for the aesthetics and applicability of the terminal, when the at least one set of support bars are in the contracted state, the at least one set of support bars may be designed as being inside the terminal.

Figure 10:
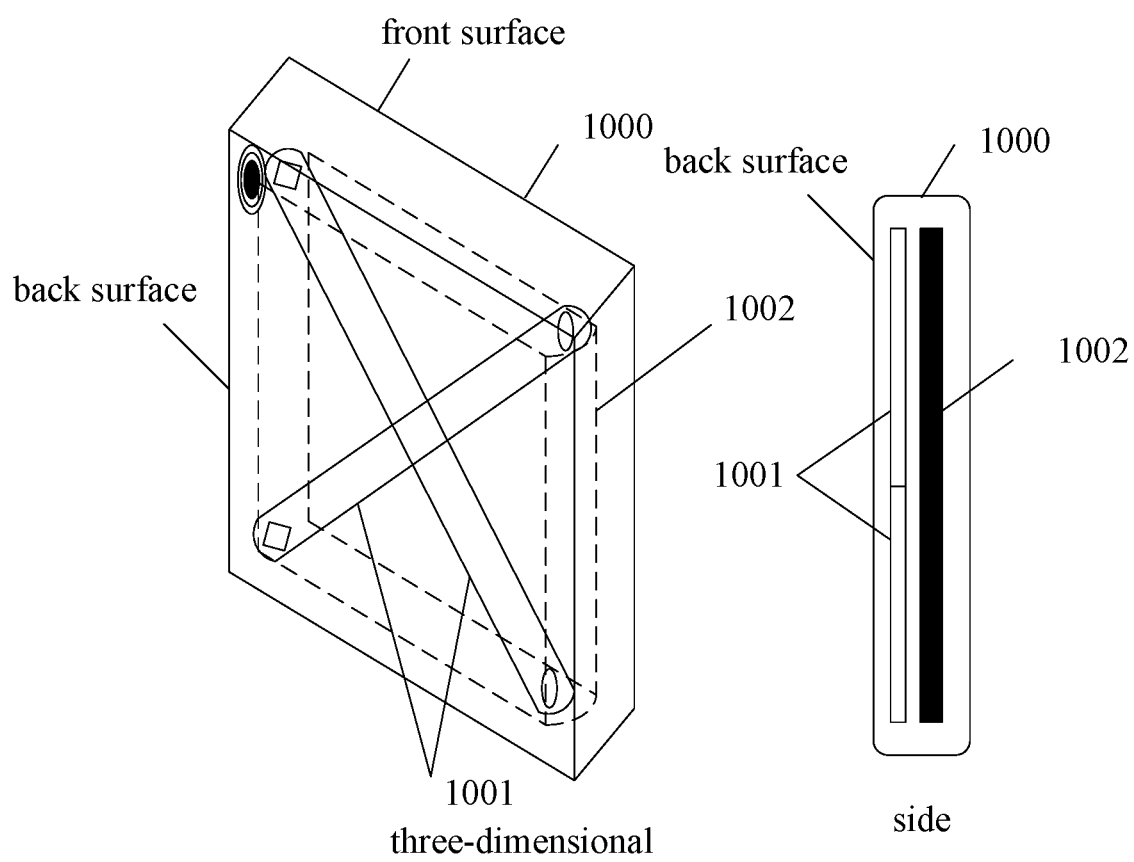
FIG. 10 is a schematic side view showing a structure of a terminal according to an embodiment of the present disclosure.

In an embodiment, the at least one set of support bars are outside of the first display screen when the support assembly is in the contracted state. FIG. 10 is a schematic side view showing a structure of the terminal in FIG. 5 according to an embodiment of the present disclosure. As shown in FIG. 10, a terminal 1000 includes at least one set of support bars 1001 and a first display screen 1002. The at least one set of support bars 1001 are located on the outside of the first display screen. In this way, when the first display screen of the terminal is in the folded state, the support bars can protect the first display screen to a certain extent, thereby improving the durability of the flexible screen.

Figure 11:
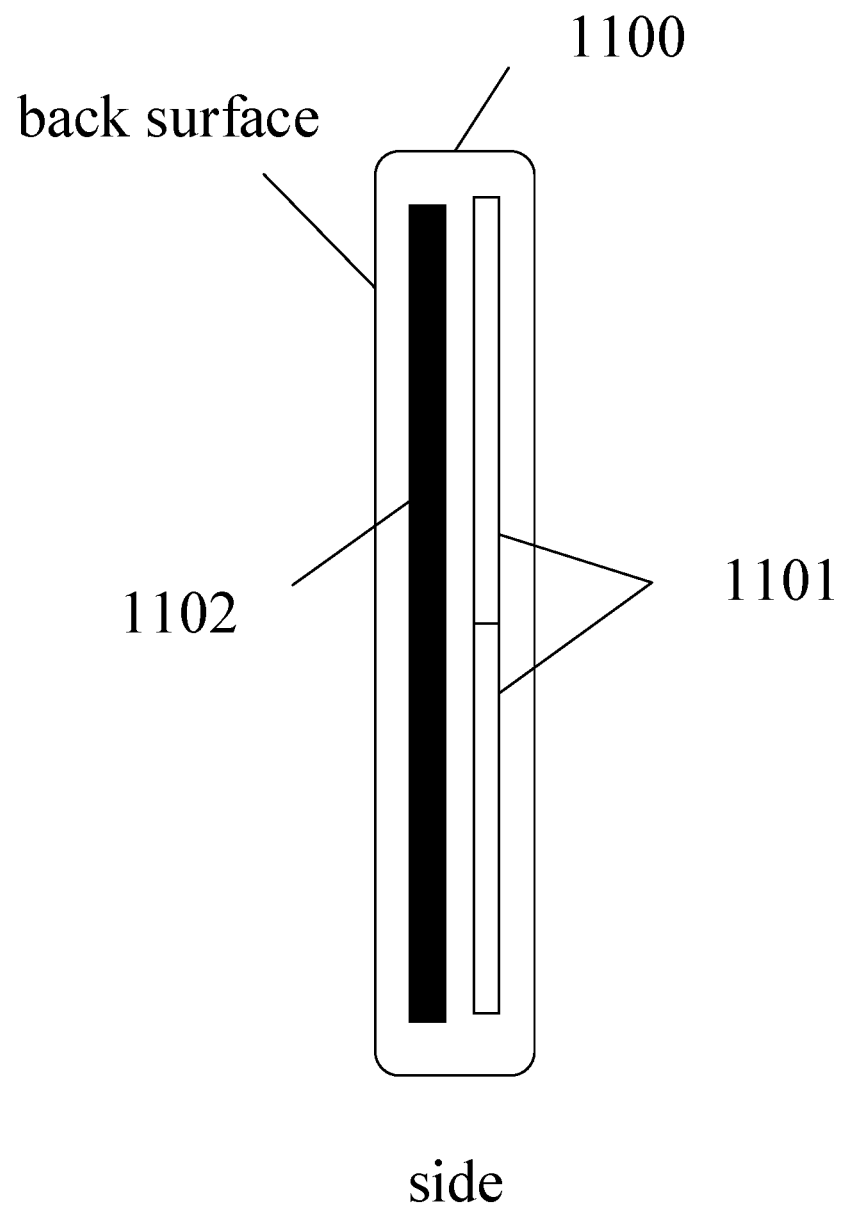
FIG. 11 is a schematic side view showing a structure of a terminal according to an embodiment of the present disclosure.

In another embodiment, the at least one set of support bars are at the inner side of the first display screen when the support assembly is in the contracted state. FIG. 11 is a schematic side view showing a structure of a terminal in FIG. 5 according to an embodiment of the present disclosure. As shown in FIG. 11, a terminal 1100 includes at least one set of support bars 1101 and a first display screen 1102. The at least one set of support bars 1101 are located on the inner side of the first display screen. In this way, when the first display screen of the terminal is in the folded state, the support bars do not block the first display screen, so that the first display screen can display contents under the folded state, and thus more display areas of the terminal may be used.

For example, the display area of the first display screen 1102 includes a visible area after being folded and a hidden area after being folded. When the first display screen 1102 is folded in the folding and unfolding device, the visible area after being folded can be directly observed by the user. When the user uses the terminal in the folded state, the user may use the visible area after being folded in the first display screen 1102 to display information. When the terminal uses the visible area after being folded in the first display screen 1102 to display information, the hidden area after being folded in the first display screen 1102 may be in an off state.

In some embodiments, in the terminal shown in FIG. 5, the folding and unfolding device 502 may further include a servo component connected to second ends of the at least one set of support bars. The servo component may be configured to push the first ends of the at least one set of support bars to move toward the unfolding direction of the first display screen by pushing the second ends of the at least one set of support bars during the change of the support assembly from the contracted state to the support state. Correspondingly, when the first display screen needs to be changed from the unfolded state to being received in the folding and unfolding device, the servo component can be configured to push the first ends of the at least one set of support bars to move toward the folding direction of the first display screen by pushing the second ends of the at least one set of support bars during the change of the support assembly from the support state to the contracted state.

In some embodiments, the servo component may be an electric drive machine that drives the second ends of the at least one set of support bars to simultaneously move in respective fixed tracks, so that the first ends of the at least one set of support bars move toward the unfolding direction of the first display screen. As shown in FIG. 5, a first track 506 is a track in which the second end of a first support bar moves, and a second track 507 is a track in which the second end of a second support bar moves. In some embodiments, the electric drive machine drives the second ends of the at least one set of support bars to simultaneously move in respective tracks, so that the first ends of the at least one set of support bars move toward the unfolding direction of the first display screen, thereby driving the first display screen to be unfolded from the receiving device. That is, the second ends of at least one set of support bars are driven from a first track point to a second track point to make the first display screen unfolded. The first track point may coincide with the second ends of the at least one set of support bars in the contracted state, and the second track point may coincide with the first ends of the at least one set of support bars in the contracted state.

In some embodiments, the servo component may also use a magnetic power push, and the second ends of the at least one set of support bars are simultaneously driven to move in respective fixed tracks by magnetic force, so that the first ends of the at least one set of support bars move toward the unfolding direction of the first display screen. That is, similarly, the second ends of the at least one set of support bars are driven from the first track point to the second track point to make the first display screen unfolded. It should be noted that embodiments of the present disclosure do not impose limitations on which kind of power the servo component uses to move the second ends of the at least one set of support bars in respective fixed tracks and thereby to make the first display screen unfolded from the receiving device through the first ends of the at least one set of support bars.

Similarly, the terminal, through the servo component, pushes the second ends of the at least one set of support bars to simultaneously move in respective fixed tracks, so that the first ends of the at least one set of support bars moves toward the folding direction of the first display screen, which may be a reverse direction of the unfolding direction of the first display screen. That is, the second ends of the at least one set of support bars are driven from the second track point to the first track point, thereby causing the first display screen to change from the unfolded state to the folded state. In some embodiments, the shape of the first track and the second track may also be a curved shape, a linear shape, or the like.

In some embodiments, the servo component can be controlled by a processor in the terminal. That is, the terminal shown in FIG. 5 can further include a processor, and the processor is electrically connected to the servo component. Correspondingly, the processor can be configured to send a control signal to the servo component after acquiring a control instruction in the terminal. The control signal is used to instruct the servo component to push the second ends of the at least one set of support bars. The control instruction can be used to indicate that the first display screen needs to be unfolded from the folding and unfolding device or house or received in the folding and unfolding device.

In some embodiments, when the folding and unfolding component is used in the terminal, the use of the first antenna group in the folding and unfolding component and the first display screen may be determined based on the unfurling signal for the first display screen.

In an embodiment, when the first display screen in the terminal changes from the state in FIG. 5 to the support state shown in FIG. 7, if the first display screen is unfolded, the terminal can further send a start signal to the first antenna group by the processor, such that the terminal activates the first antenna group to transmit and receive data through the first antenna group.

In an embodiment, the unfolding of the first display screen can directly trigger the terminal to use the first antenna group. For example, if the terminal is provided a fixed switch, the fixed switch can be used to enable or disable the first antenna group. The fixed switch can be used to directly connect the first antenna group when the first display screen is unfolded. That is, when the first display screen is triggered to be unfolded, the fixed switch is simultaneously triggered, thereby causing the terminal to use the first antenna group.

In embodiments of the present disclosure, the first antenna group is disposed in the folding and unfolding device. By the folding and unfolding device, if the terminal makes the first display screen unfolded from the folding and unfolding device, the terminal may use the first antenna group in the folding and unfolding device to transmit data. In this way, embodiments of the present disclosure can avoid that if the appearance of the terminal is changed, the wireless environment for the terminal to transmit and receive data becomes poor and the performance of the terminal in data transmission and reception becomes poor. Accordingly, embodiments of the present disclosure can improve the performance of the terminal in data transmission and reception.

Figure 12:
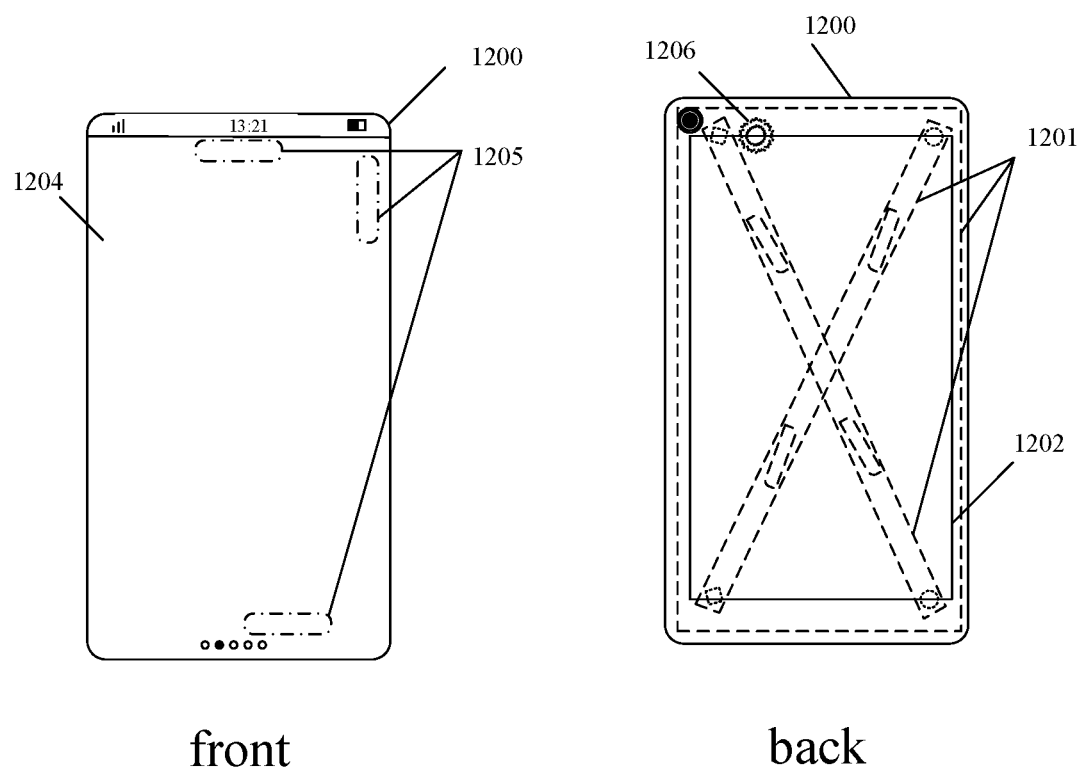
FIG. 12 is a schematic diagram of a terminal according to an embodiment of the present disclosure.

In an embodiment, the terminal shown in FIG. 4 may further include a second display screen, a second antenna group, and a radio frequency chip. FIG. 12 is a schematic diagram of a terminal according to an embodiment of the present disclosure. As shown in FIG. 12, the terminal 1200 includes a folding and unfolding device 1201, a first display screen 1202, a first antenna group 1203, a second display screen 1204, a second antenna group 1205, and a radio frequency chip 1206.

For example, for the arrangement of the folding and unfolding device 1201, the first display screen 1202, and the first antenna group 1203, FIG. 4 can be referred to, and details are not described herein again. The second display screen 1204 may be disposed on the front side of the terminal 1200. The second antenna group 1205 may be the terminal's own set of antennas. For example, the terminal may be designed with its own main antenna, diversity antenna, satellite positioning antenna, and wireless fidelity Wi-Fi antenna and a Bluetooth antenna and so on, and the terminal may use the second antenna group to transmit and receive data. In some embodiments, the setting positions of the first display screen and the second display screen may also be reversed, that is, the first display screen is disposed on the front side of the terminal, and the second display screen is disposed on the back side of the terminal.

In an embodiment, the second antenna group may be an antenna group that is set in advance according to a shape and structure of the terminal after the first display screen is folded. That is, when the developer of the terminal sets the second antenna group, the target is that the second antenna group can achieve relatively high antenna performance in the case where the first display screen is folded.

In some embodiments, the first antenna group and the second antenna group include the same type of antenna. That is, the first antenna group provided by the folding and unfolding device in the embodiments of the present disclosure needs to be able to match the type corresponding to the wireless data that the second antenna group can receive, so that when the terminal switches between the first antenna group and the second antenna group, the wireless communication data transmitted and received by one group of antennas can be replaced by another group of antennas.

In some embodiments, the radio frequency chip is electrically connected to the first antenna group in the folding and unfolding device of the folding and unfolding assembly. The radio frequency chip is electrically connected to the second antenna group. When the folding and unfolding device unfolds the first display screen by the change in structural form, the radio frequency chip may be used to switch from transmitting and receiving wireless data by the second antenna group to transmitting and receiving wireless data by the first antenna group. That is, when the folding and unfolding device unfolds the first display screen, the radio frequency chip can control the terminal to switch from wireless data transmission and reception through the second antenna group to wireless data transmission and reception through the first antenna group.

In some embodiments, the developer can set a specified condition for the radio frequency chip. When the specified condition is met, the terminal can switch from wireless data transmission and reception through the second antenna group to wireless data transmission and reception through the first antenna group. In an embodiment, the radio frequency chip is configured to: if a first specified condition is met, determine that the folding and unfolding device unfolds the first display screen by the change in structural form.

The first specified condition may include at least one of the following conditions that: a first signal sent by a processor in the terminal is received, wherein the first signal is a signal generated when the processor determines that the first display screen is unfolded; a second signal generated when a designated button is triggered is received, wherein the designated button is a button for controlling folding or unfolding of the first display screen; and a third signal generated when a first designated switch is turned on is received, wherein the first designated switch is a switch that is triggered to be turned on when the first display screen is unfolded. That is, the first specified condition may be set by the developer, and when the radio frequency chip receives a certain signal, the radio frequency chip can determine that the specified condition is met. The certain signal can be at least one of the first signal, the second signal and the third signal.

In an embodiment, the first signal is a signal generated when the processor determines that the first display screen is unfolded. When the first display screen is unfolded, the processor in the terminal accordingly generates the first signal and sends the first signal to the radio frequency chip. When the radio frequency chip receives the first signal, the radio frequency chip determines that the first specified condition is met and that the folding and unfolding device unfolds the first display screen, and at this time the radio frequency chip can enable the first antenna group through the connection between the radio frequency chip and the first antenna group, and accordingly the terminal can use the first antenna group to transmit and receive data. In some embodiments, if the terminal is currently using the second antenna group to transmit and receive data, the radio frequency chip can temporarily stop using the second antenna group through the connection between the radio frequency chip and the second antenna group, and accordingly the terminal can switch from data transmission and reception through the second antenna group to data transmission and reception through the first antenna group. In an embodiment, before the terminal enables the first antenna group and there is no data transmission and reception, the radio frequency chip can enable the first antenna group without performing switching between different antenna groups.

In an embodiment, the terminal may be internally provided with a posture sensor, and the posture sensor may determine whether to unfold the first display screen by the posture of the terminal. For example, when the first display screen of the terminal faces away from the earth's core, the terminal determines that the first display screen needs to be unfolded. When the first display screen is unfolded, the first signal may be generated by the processor and sent to the radio frequency chip. When the radio frequency chip receives the first signal, it is determined that the first specified condition is met and the folding and unfolding device has unfolded the first display screen. Accordingly, the first antenna group is enabled to perform data transmission and reception.

Figure 13:
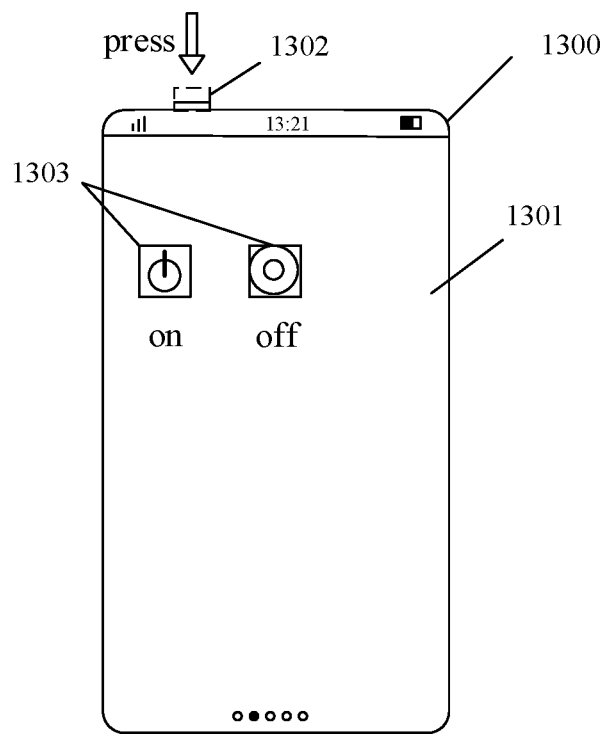
FIG. 13 shows a display interface of a front side of a terminal according to an embodiment of the present disclosure.

In an embodiment, when the terminal is provided with a button for controlling the folding and unfolding device to fold or unfold the first display screen, the terminal generates a corresponding second signal in response to the designated button being triggered. The second signal is a signal generated by the processor when the first display screen is unfolded in response to that a designated button is triggered. In an embodiment, the designated button is a physical button or virtual button for controlling the folding or unfolding of the first display screen. For example, FIG. 13 shows a display interface of a front side of a terminal according to an embodiment of the present disclosure. As shown in FIG. 13, a terminal 1300 includes a first display screen 1301 and a first button 1302. It is assumed that the downward pressing of the first button 1302 corresponds to the unfolding of the first display screen, and the restoration of the first button 1302 corresponds to the folding of the first display screen.

A user can press down the first button 1302 to send an instruction for unfolding the first display screen to the processor of the terminal. The processor of the terminal may further generate, according to the instruction for unfolding the first display screen, a signal generated when the first button is triggered (that is, the signal is a control signal sent by the processor to the servo component). The processor of the terminal sends the generated signal which corresponds to the signal generated when the first button is triggered to the servo component, so that the servo component acquires the control signal and drives at least one set of support bars to move along the tracks similar to that in FIG. 5, and accordingly the first display screen is unfolded. Correspondingly, when the first button is pressed, the processor may further send the generated second signal to the radio frequency chip, so that the radio frequency chip obtains the second signal to control the terminal to use the first antenna group to transmit and receive wireless data.

Figure 14:
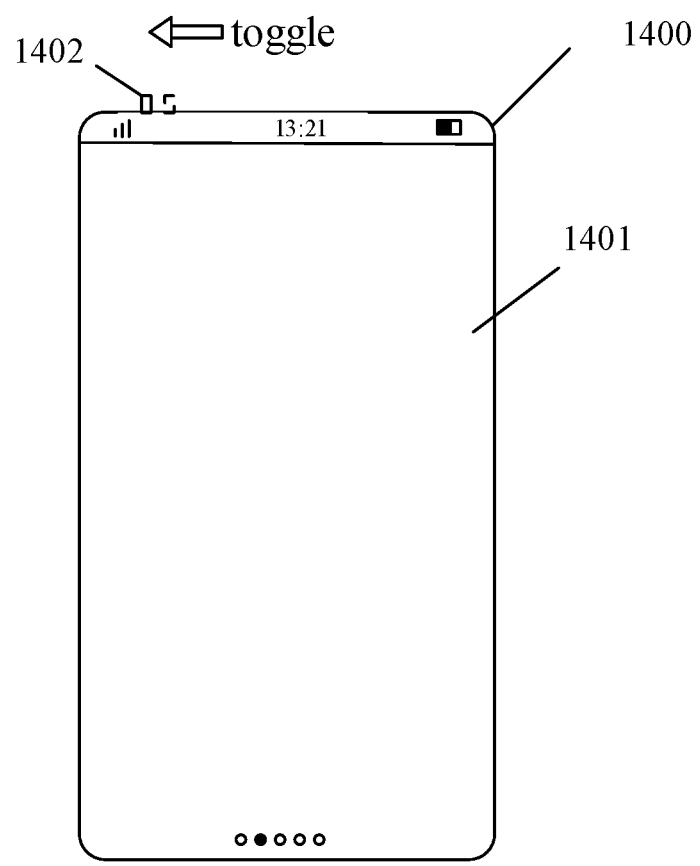
FIG. 14 shows a display interface of a front side of a terminal according to an embodiment of the present disclosure.

In some embodiments, the first button 1302 shown in FIG. 13 may also be left and right toggled, thereby triggering folding or unfolding of the first display screen. FIG. 14 shows a display interface of a front side of a terminal according to an embodiment of the present disclosure. For example, as shown in FIG. 14, a terminal 1400 includes a first display screen 1401 and a first button 1402. It is assumed that toggling the first button 1402 to the left corresponding to the unfolding of the first display screen, and toggling the first button 1402 to the right is corresponding to the folding of the first display screen. When the user toggles the first button to the left, the terminal can generate a control signal, like that when the first button is pressed. The control signal is sent to the servo component, so that the servo component acquires the control signal and drives at least one set of support bars in the folding and unfolding device to unfold the first display screen. Similarly, when the user toggles the first button to the left, the generated second signal is sent to the radio frequency chip.

In some embodiments, the first display screen 1301 in FIG. 13 may further display virtual buttons 1303. When the user taps the on button in the virtual buttons 1303, the terminal may generate an instruction for controlling the first display screen to be unfolded in response to that the on button is triggered; when the user taps the off button in the virtual buttons 1303, the terminal may generate an instruction for controlling the first display screen to be folded in response to that the off button is triggered. Further, according to the received instruction, the processor of the terminal may send to the servo component a control signal that controls the servo component to push the second ends of the at least one set of support bars. In this way, the second ends of the at least one set of support bars are driven, and the first display screen is unfolded or folded. Correspondingly, when the on button in the virtual buttons is triggered, the processor may further send the generated second signal to the radio frequency chip. The radio frequency chip obtains the second signal to control the terminal to use the first antenna group to send and receive wireless data.

In an embodiment, the terminal may further be provided with a first designated switch. The first designated switch is a switch that is triggered to turn on when the first display screen is unfolded. For example, when the first display screen is unfolded, the first designated switch is automatically triggered, thereby triggering the processor to start the step of generating a third signal, so that the processor generates a third signal and sends the third signal to the radio frequency chip. The radio frequency chip obtains the third signal to control the terminal to transmit and receive wireless data using the first antenna group.

In some embodiments, the radio frequency chip is configured to switch from performing transmission and reception of wireless data through the second antenna group to performing transmission and reception of the wireless data through the first antenna group, when the folding and unfolding device unfolds the first display screen by the change in structural form and a signal quality of a wireless signal received through the second antenna group is lower than a first quality threshold.

In an embodiment, the radio frequency chip may further acquire a signal quality of the wireless signal received by the second antenna group, and compare the signal quality of the wireless signal received by the second antenna group with the first quality threshold. When the signal quality of the wireless signal received by the terminal through the second antenna group is lower than the first quality threshold, the radio frequency chip switches from performing transmission and reception of wireless data through the second antenna group to performing transmission and reception of the wireless data through the first antenna group. That is, when the terminal uses the folding and unfolding assembly provided by the embodiments of the present disclosure, the terminal can directly determine whether the signal quality of the wireless signal received by the second antenna group is higher than the first quality threshold, thereby determining whether the antenna needs to be switched to receive the wireless data. In some embodiments, in this case, the radio frequency chip may not determine whether the first specified condition is met and directly complete antenna switching for the terminal.

In some embodiments, the first quality threshold may be a corresponding quality threshold when an application is enabled in the terminal. For example, when a first application is currently running in the terminal and the signal quality threshold of the first application is P, the radio frequency chip may use the signal quality threshold of the currently running first application as the first quality threshold. Whether the signal quality of the wireless signal received by the second antenna group is lower than P is determined. If the signal quality of the wireless signal received by the second antenna group is lower than P, the terminal is controlled to switch from performing transmission and reception of wireless data through the second antenna group to performing transmission and reception of the wireless data through the first antenna group.

It should be noted that the solution in which the radio frequency chip determines whether the first specified condition is met, and the solution in which whether the signal quality of the wireless signal received by the second antenna group is lower than the first quality threshold is determined may be used in combination, and embodiments of the present disclosure do not impose specific limitations on this.

Correspondingly, the radio frequency chip is further configured to switch from performing transmission and reception of the wireless data through the first antenna group to performing transmission and reception of the wireless data through the second antenna group, when the folding and unfolding device folds the first display screen by the change in structural form. In other words, the radio frequency chip can control the terminal to switch from performing wireless data transmission and reception through the first antenna group to performing wireless data transmission and reception through the second antenna group, when the folding and unfolding device folds the first display screen.

In some embodiments, the developer can set a second specified condition for the radio frequency chip. When the second specified condition is met, the terminal can switch from performing wireless data transmission and reception through the second antenna group to performing wireless data transmission and reception through the first antenna group. That is, the radio frequency chip is configured to, if a second specified condition is met, determine that the folding and unfolding device folds the first display screen by the change in structural form.

The second specified condition includes at least one of the following conditions that: a fourth signal sent by a processor in the terminal is received, wherein the fourth signal is a signal generated when the processor determines that the first display screen is folded; a fifth signal generated when a designated button is triggered is received, wherein the designated button is a button for controlling folding or unfolding of the first display screen; and a sixth signal generated when a second designated switch is turned on is received, wherein the second designated switch is a switch that is triggered to be turned off when the first display screen is folded.

In an embodiment, the fourth signal is a signal that is generated when the processor determines that the first display screen is folded. For example, when the first display screen is folded, the processor in the terminal may generate a fourth signal and sends the fourth signal to the radio frequency chip. When the radio frequency chip receives the fourth signal, the radio frequency chip determines that the first specified condition is met, and determines that the folding and unfolding device has folded the first display screen. At this time, the radio frequency chip can enable the first antenna group through the electrical between the radio frequency chip and the first antenna group, such that the terminal transmits and receives data through the first antenna group. In some embodiments, when the terminal is currently using the second antenna group to send and receive data, the radio frequency chip may further temporarily stop using the second antenna group through the electrical between the radio frequency chip and the second antenna group, so as to control the terminal to from switch from performing transmission and reception of wireless data through the second antenna group to performing transmission and reception of the wireless data through the first antenna group. In an embodiment, before the terminal enables the first antenna group and there is no data transmission and reception, the radio frequency chip can enable the first antenna group without performing switching between different antenna groups. In some embodiments, the resource for trigger the fourth signal and the source for trigger the first signal may be the same.

For example, the posture sensor disposed in the terminal is still taken as an example. When the first display screen of the terminal faces away from the earth's core, the terminal determines that the first display screen needs to be folded. When the first display screen is folded, the processor may generate the fourth signal and send the fourth signal to the radio frequency chip. When the radio frequency chip receives the fourth signal, it is determined that the second specified condition is met, and it is determined that the folding and unfolding device has folded the first display screen, and the second antenna group is enabled to perform wireless data transmission and reception.

In an embodiment, when the terminal is provided with a button for controlling the folding and unfolding device to fold or unfold the first display screen, the terminal generates a corresponding fifth signal in response to that the designated button is triggered. The fifth signal is a signal generated by the processor when the first display screen is folded in response to that a designated button is triggered. In an embodiment, the designated button is a physical button or virtual button for controlling folding or unfolding of the first display screen. For example, in FIG. 13, the first button may be restored to the original position, thereby transmitting an instruction for folding the first display screen to the processor of the terminal. When the first button is restored, the processor may further send the generated fifth signal to the radio frequency chip. The radio frequency chip obtains the fifth signal to control the terminal to use the first antenna group to transmit and receive wireless data. Similarly, a signal corresponding to the triggering of the off button in the virtual buttons 1303 may be generated, and for details, reference may be made to the previous description regarding the triggering of the on button, and details are not described herein again. That is to say, the second signal and the fifth signal can be triggered from the same source.

In an embodiment, the terminal may further be provided with a second designated switch. The second designated switch is a switch that is triggered to turn off when the first display screen is folded. For example, when the first display screen is folded, the second designated switch is automatically triggered, thereby triggering the processor to start the step of generating a sixth signal, so that the processor generates a sixth signal and sends the sixth signal to the radio frequency chip. The radio frequency chip obtains the sixth signal to control the terminal to transmit and receive wireless data using the second antenna group. The second designated switch and the first designated switch may be the same switch.

The radio frequency chip is configured to switch from performing transmission and reception of wireless data through the first antenna group to performing transmission and reception of the wireless data through the second antenna group, when the folding and unfolding device folds the first display screen by the change in structural form and a signal quality of a wireless signal received through the first antenna group is lower than a second quality threshold. The second quality threshold may be a quality threshold when an application is enabled in the terminal. For details about the step for determining the second quality threshold, reference can be made to the previous description regarding the first quality threshold and repeated descriptions are omitted here.

In embodiments of the present disclosure, the first antenna group is disposed in the folding and unfolding device. By the folding and unfolding device, if the terminal makes the first display screen unfolded from the folding and unfolding device, the terminal may use the first antenna group in the folding and unfolding device to transmit data. In this way, embodiments of the present disclosure can avoid that if the appearance of the terminal is changed, the wireless environment for the terminal to transmit and receive data becomes poor and the performance of the terminal in data transmission and reception becomes poor. Accordingly, embodiments of the present disclosure can improve the performance of the terminal in data transmission and reception.

Other embodiments of the invention will be apparent to those skilled in the art from consideration of the specification and practice of the invention disclosed here. This application is intended to cover any variations, uses, or adaptations of the invention following the general principles thereof and including such departures from the present disclosure as come within known or customary practice in the art. It is intended that the specification and examples be considered as exemplary only, with a true scope and spirit of the invention being indicated by the following claims.

It will be appreciated that the present invention is not limited to the exact construction that has been described above and illustrated in the accompanying drawings, and that various modifications and changes can be made without departing from the scope thereof. It is intended that the scope of the invention only be limited by the appended claims.

What is claimed is:

1. An assembly for folding and unfolding a screen, wherein
the assembly is disposed in a terminal and comprises:
a folding and unfolding device, a first display screen, and a first antenna group;
wherein:
the first display screen is a flexible screen;
the folding and unfolding device is configured to fold or unfold the first display screen by a change in structural form; and
the first antenna group is disposed in the folding and unfolding device,
wherein the folding and unfolding device comprises a support assembly which has a contracted state and a supporting state, and
the first antenna group is disposed in the support assembly.

2. The assembly according to claim 1, wherein the support assembly comprises at least one set of support bars, first ends of the at least one set of support bars are coupled to the first display screen, a moving direction of the first ends of the at least one set of support bars connected to the first display screen is the same as a direction in which the first display screen is folded or unfolded;
wherein the first antenna group is disposed inside the at least one set of support bars or on surfaces of the at least one set of support bars.

3. The assembly according to claim 1, wherein the first antenna group comprises at least one of a main antenna, a diversity antenna, a satellite positioning antenna, a wireless fidelity Wi-Fi antenna, or a Bluetooth antenna.

4. A terminal, comprising an assembly for folding and unfolding a screen, wherein the assembly is disposed in the terminal and comprises:
a folding and unfolding device, a first display screen, and a first antenna group;
wherein:
the first display screen is a flexible screen;
the folding and unfolding device is configured to fold or unfold the first display screen by a change in structural form; and
the first antenna group is disposed in the folding and unfolding device;
wherein the folding and unfolding device comprises a support assembly which has a contracted state and a supporting state, and
the first antenna group is disposed in the support assembly.

5. The terminal according to claim 4, wherein:
the terminal further comprises a radio frequency chip and a second antenna group;
the radio frequency chip is electrically connected to the first antenna group in the folding and unfolding device, and the radio frequency chip is electrically connected to the second antenna group; and
the radio frequency chip is configured to switch from performing transmission and reception of wireless data through the second antenna group to performing transmission and reception of the wireless data through the first antenna group when the folding and unfolding device unfolds the first display screen by the change in structural form.

6. The terminal according to claim 5, wherein:

the radio frequency chip is configured to, if a first specified condition is met, determine that the folding and unfolding device unfolds the first display screen by the change in structural form; and the first specified condition includes at least one of the following conditions that:

a first signal sent by a processor in the terminal is received, wherein the first signal is generated when the processor determines that the first display screen is unfolded;

a second signal generated when a designated button is triggered is received, wherein the designated button is for controlling folding or unfolding of the first display screen; or a third signal generated when a first designated switch is turned on is received, wherein the first designated switch is triggered to be turned on when the first display screen is unfolded.

7. The terminal according to claim 5, wherein:

the radio frequency chip is configured to switch from performing transmission and reception of wireless data through the second antenna group to performing transmission and reception of the wireless data through the first antenna group, when the folding and unfolding device unfolds the first display screen by the change in structural form and a signal quality of a wireless signal received through the second antenna group is lower than a first quality threshold.

8. The terminal according to claim 5, wherein:

the radio frequency chip is configured to switch from performing transmission and reception of the wireless data through the first antenna group to performing transmission and reception of the wireless data through the second antenna group, when the folding and unfolding device folds the first display screen by the change in structural form.

9. The terminal according to claim 8, wherein:

the radio frequency chip is configured to, if a second specified condition is met, determine that the folding and unfolding device folds the first display screen by the change in structural form; and the second specified condition includes at least one of the following conditions that:

a fourth signal sent by a processor in the terminal is received, wherein the fourth signal is generated when the processor determines that the first display screen is folded;

a fifth signal generated when a designated button is triggered is received, wherein the designated button is for controlling folding or unfolding of the first display screen; and a sixth signal generated when a second designated switch is turned on is received, wherein the second designated switch is triggered to be turned off when the first display screen is folded.

10. The terminal according to claim 8, wherein:

the radio frequency chip is configured to switch from performing transmission and reception of wireless data through the first antenna group to performing transmission and reception of the wireless data through the second antenna group, when the folding and unfolding device folds the first display screen by the change in structural form and a signal quality of a wireless signal received through the first antenna group is lower than a second quality threshold.

11. The terminal according to claim 5, wherein the first antenna group and the second antenna group comprise a same type of antenna.

* * * * *